June 29, 1948.  P. P. NEWCOMB  2,444,363
HELICAL SPLINE TORQUE INDICATOR
Filed Aug. 30, 1944  2 Sheets-Sheet 2

INVENTOR.
Philip Putney Newcomb
BY
John C. Kerr
ATTORNEY

Patented June 29, 1948

2,444,363

UNITED STATES PATENT OFFICE 2,444,363

HELICAL SPLINE TORQUE INDICATOR

Philip Putney Newcomb, Manchester, Conn., assignor to United Aircraft Corporation, East Hartford, Conn., a corporation of Delaware Application August 30, 1944, Serial No. 551,995

8 Claims. (Cl. 73—136)

This invention relates to torque indicators or meters and has for its object to provide a novel and improved device of this type for giving a continuous reading of the torque to which an aircraft engine or other mechanism is subjected.

Another object of the invention is to provide a torque indicator which is simple in construction, efficient in operation, and is considerably lighter and less bulky than previous devices of this type.

Another object is to provide a torque indicator of the foregoing type having novel and improved details of construction and features of operation.

Various other objects and advantages will be apparent as the nature of the invention is more fully disclosed.

Although the invention is useful in many different situations in the mechanical arts, I shall illustrate it in its application to an airplane engine having a planetary reduction gear between the engine crankshaft and the propeller shaft, in which type of power plant economy of size and weight are of paramount importance.

In one such installation, hereinafter described, the "stationary" reaction member of the planetary reduction gear train is secured to the reduction gear housing by means of a special helical spline concentric with the axis of the gear. The reaction torque of the stationary reaction member causes said member to turn and advance along the helix. The thrust so produced is resiliently restrained by one or more hydraulic devices containing oil or other fluid under pressure, and the pressure exerted in the hydraulic line, which may be registered on a suitable meter, is a measure of the torque exerted by the engine.

Although the novel features which are characteristic if this invention are set forth more in detail in the claims appended hereto, the nature and scope of the invention may be better understood by referring to the following description, taken in connection with the accompanying drawings forming a part thereof, in which certain specific embodiments have been set forth for purposes of illustration.

In the following description certain specific terms are used for convenience in referring to the various details of the invention. These terms, however, are to be interpreted as broadly as the state of the art will permit.

Figure 1:
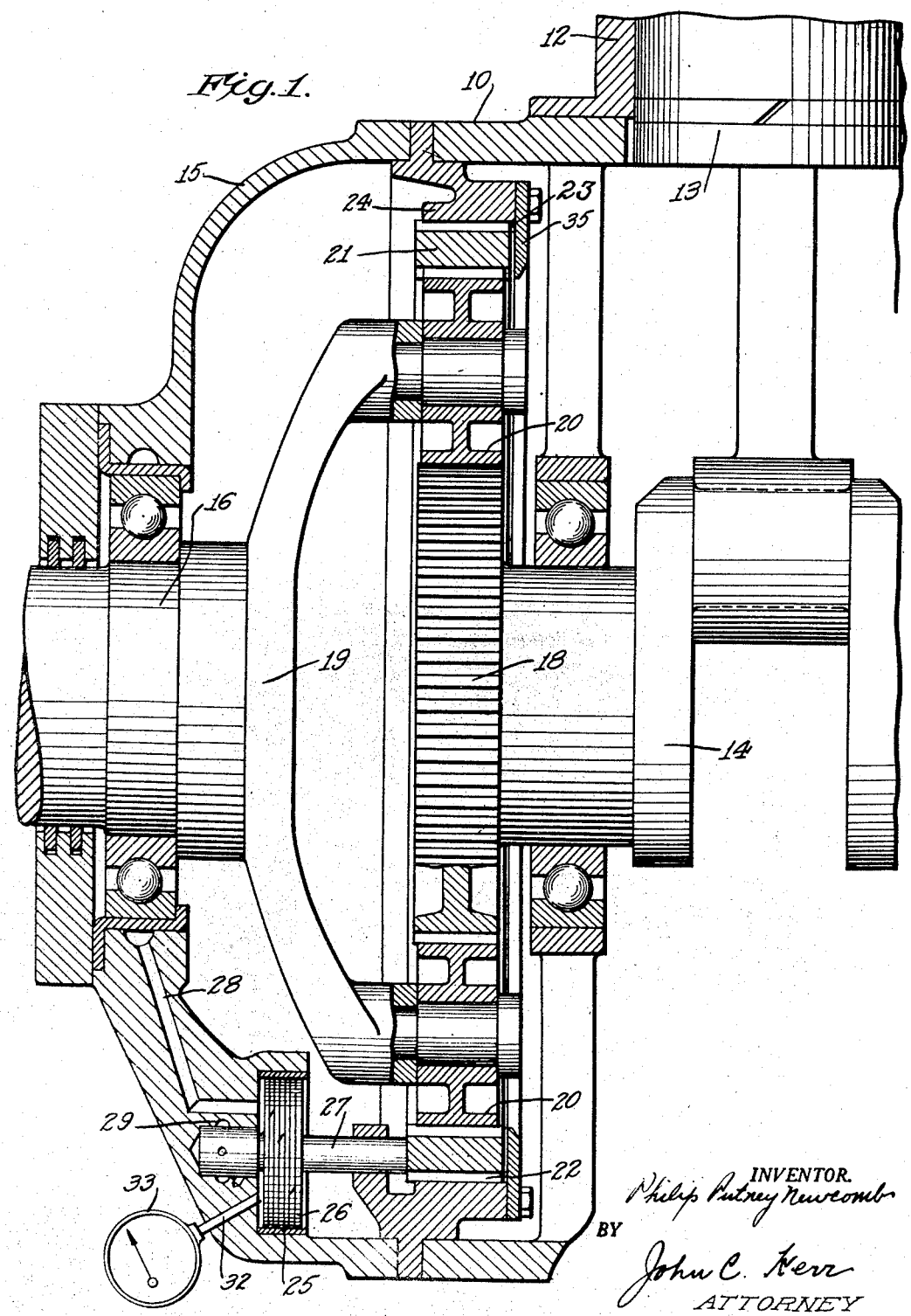
Fig. 1 is a longitudinal sectional view through the nose section of an airplane engine, showing the application thereto of a torque indicating mechanism embodying the invention.
Figure 2:
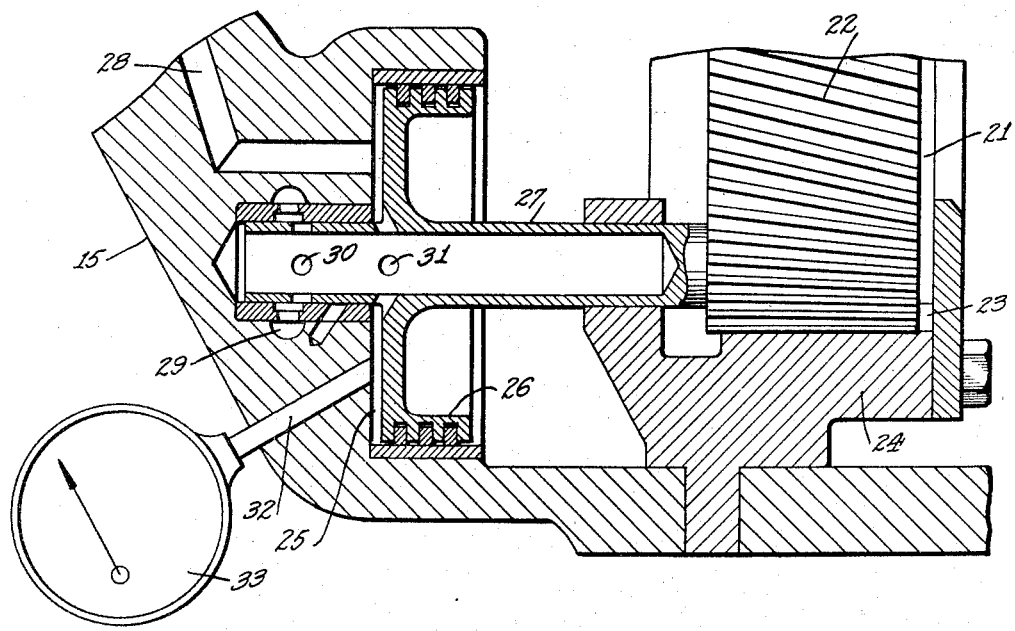
Fig. 2 is an enlarged sectional view of a portion of Fig. 1, showing details of the hydraulic metering system.

In Figs. 1 and 2 an internal combustion engine ordinarily employed for the propulsion of aircraft is represented as comprising a crankcase 10 around or along which are arranged a plurality of cylinders 12 containing pistons 13 which are connected to the crankshaft 14 in the usual manner.

From the nose section 15, which is secured to the crankcase, projects the propeller shaft 16 carrying an aeronautical propeller, not shown. The propeller shaft 16 is connected to the engine crankshaft 14 by a planetary reduction gear which will now be described.

The reduction gear mechanism of Fig. 1 includes a suitable sun gear 18 drivingly connected to the crankshaft, and a rotatable cage 19 drivingly connected to the propeller shaft and carrying planet gears 20 which mesh with the external gear teeth of the sun gear 18 and with the internal gear teeth of a relatively fixed reaction gear 21.

As shown in Figs. 1 and 2, the external periphery of the reaction gear 21 is provided with helical splines 22 meshing with corresponding helical splines 23 on the interior flange 24 of the engine casing. When the engine is operating, the reaction torque of the relatively fixed gear 21, tending to rotate said gear, causes same to move sideways along the path prescribed by the helical splines 22 and 23.

The thrust so produced by the sliding movement of reaction gear 21 is balanced or restrained by a hydraulic system including one or more hydraulic cylinders 25 each containing a piston 26 having a shaft 27 bearing on the face of gear 21, as best shown in Fig. 2. The system illustrated herein employs a plurality of such hydraulic devices, although only one is shown for the sake of simplicity.

The hydraulic system contains oil under pressure, derived from the engine lubricating system and supplied to the cylinder 25 from annular channel 29 in crankcase 15 through valve ports 30 leading to the hollow interior of the piston shaft 27. The channel 28 communicates with ports 31 in the shafts 27 of all the pistons 26, and serves to equalize the pressure among the various pistons. The hydraulic cylinder 25 is connected by duct 32 to a suitable meter 33 adapted to register variations in the pressure exerted in the hydraulic line.

If the hydraulic cylinder 25 were entirely sealed and had no inlets or outlets, the pressure of the oil therein would always be a function of engine torque. However, in actual practice there is always some leakage from the cylinder, for instance past the piston rings, and it is therefore necessary to provide the valved inlet 29—30 which replaces this leakage. If this inlet were continuously open, the pressure in cylinder 25 would always be at inlet pressure. However, this is not true of the arrangement shown, because ports 30 are closed off as the oil is admitted and the piston 26 is forced thereby to the right in Fig. 2 against the helically splined gear 21. As the oil leaks from the cylinder 25, the piston 26 will be forced to the left until ports 30 are uncovered to inlet channel 29 which will admit oil to the cylinder and again force the piston to the right to cut off the supply of oil, as described above. With this arrangement, it is of course necessary that the inlet pressure in the channel 29 be sufficiently great to overcome the force exerted on the piston 26 by the helically splined gear 21.

It will be evident from the above that the pressure of the oil in the cylinder 25 is proportional to the reaction torque which, in turn, is proportional to the torque of either the driven or the driving shaft of the reduction gear. Thus the torque exerted by the engine is indicated on the meter 33. As shown in Figs. 1 and 2, the antithrust side of the stationary flange 24 of the crankcase is provided with an annular back plate 35 to limit the backward movement of reaction gear 21 under the pressure of the hydraulic system.

Figure 3:
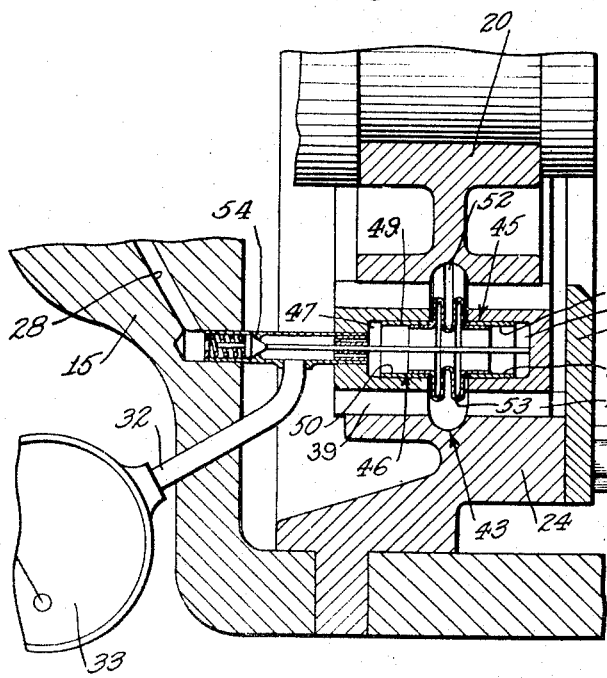
Fig. 3 is a fragmentary sectional view illustrating a modification of the invention.
Figure 4:
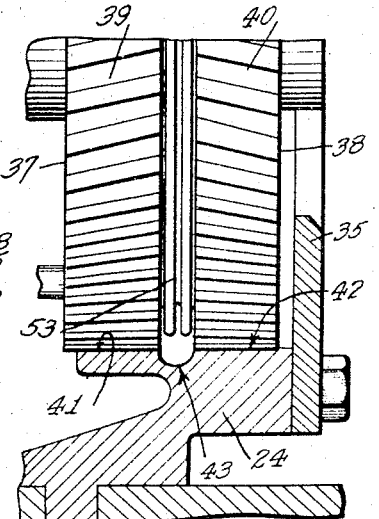
Fig. 4 is a similar view illustrating the construction of the splines on the reaction gear employed in Fig. 3.

Figs. 3 and 4 show a modification of the invention in which the relatively fixed reaction gear (corresponding with gear 21 of Figs. 1 and 2) is composed of two annular sections 37 and 38 having identical aligned internal gear teeth meshing with the planet gears 20, and having external helical splines 39 and 40, respectively, which slope in opposite directions in the manner of a so-called "herringbone" pattern. These splines 39 and 40 mesh with corresponding splines 41 and 42 on the interior flange 24 of the engine casing, the said splines 41 and 42 being separated by a groove 43 which is formed on the inner surface of flange 24 to facilitate machining of said splines.

The annular reaction gear sections 37 and 38 have internal annular recesses 47 and 48 facing each other, and within these recesses are seated two pairs of spaced concentric bands 49 and 50 which are secured to the internal flanges of the respective gear sections 37 and 38, as shown in Fig. 3. An annular bellows type seal 52 is secured to the two bands 49, and a similar annular bellows 53 of larger diameter is secured to the two bands 50 concentric with the bellows 52. The two concentric bellows 52 and 53 thus seal the annular space or chamber which exists within the gear sections 37 and 38. This sealed chamber is connected through an inlet valve 54 to the oil duct 28 leading to the engine lubricating system, and to duct 32 leading to the torque meter 33.

When the engine is operating, the reaction torque exerted upon the relatively fixed gear sections 37 and 38 causes said sections to turn and advance along the respective helical splines 41 and 42, said sections 37 and 38 moving either toward or away from each other according to the force exerted thereon. As in the embodiment previously described, the torque exerted by the engine is registered on the meter 33.

Although certain specific embodiments of the invention have been shown for purposes of illustration it is to be understood that the invention is capable of various modifications and adaptations which will be readily apparent to a person skilled in the art. The invention is only to be limited in accordance with the scope of the appended claims.

The invention claimed is:

1. In a power transmission system, a planetary gear train including a relatively fixed reaction gear subject to reaction torque, a stationary member containing helical splines, corresponding helical splines on said gear meshing with those on said stationary member whereby torque tending to rotate said gear will move said gear in the helical course of said splines, means yieldingly restraining the helical movements of said gear, and indicating means connected to said yielding means and responsive to the movement of said gear.

2. In a power transmission system, a planetary gear train including a relatively fixed reaction gear subject to reaction torque, a stationary member containing helical splines, corresponding helical splines on said gear meshing with those on said stationary member to move said gear in the helical course of said splines upon the application of torque tending to rotate said gear, means resiliently restraining the helical movement of said gear, and torque indicating means actuated by said restraining means.

3. In a power transmission system, a planetary gear train including a relatively fixed reaction gear subject to reaction torque, a stationary member containing helical splines, corresponding helical splines on said gear meshing with those on said stationary member to move said gear in the helical course of said splines upon the application of torque tending to rotate said gear, means including a hydraulic piston acting on said gear to restrain the helical movement thereof, a hydraulic fluid under pressure acting on said piston, and torque indicating means actuated by said fluid.

4. In a power transmission system, a planetary gear train including a pair of relatively fixed reaction gear sections subject to reaction torque, helical splines on said gear sections sloping in opposite directions, a stationary member having corresponding sets of helical splines meshing with those on the respective gear sections to guide said gear sections in the helical courses of said splines upon the application of torque, means including a fluid under pressure restraining the force of the torque upon said gear sections, and torque indicating means actuated by said fluid.

5. In a power transmission system, a planetary gear train including a pair of relatively fixed reaction gear sections having internal annular recesses in their adjacent faces, concentric annular bellows in said recesses sealing same into a common annular chamber for the reception of a hydraulic fluid, helical splines on the outer peripheral surface of said gear sections sloping in opposite directions, a stationary member having corresponding sets of helical splines meshing with those on the respective gear sections to guide said gear sections in the helical courses of said splines upon the application of torque, a hydraulic fluid under pressure in said annular chamber restraining the force of the torque upon said gear sections, and torque indicating means actuated by said fluid.

6. In a power transmission system having a driving member and a driven member, a planetary gear system coupling said driving and driven members comprising a reaction gear, helical splines on the exterior of said reaction gear, a fixed member carrying splines engaging the splines on the reaction gear, said splines on the gear and fixed member cooperating to shift the gear laterally of the fixed member upon the application of torque tending to rotate said gear, a hydraulic piston actuated by said shifting of the reaction gear, means controlled by the gear for supplying fluid under pressure to the working face of the piston, and indicating means responsive to pressures applied to the fluid by the piston.

7. An apparatus for indicating torque in a reduction gear train comprising a driving gear, a reaction gear, planet gears meshing with the driving gear and the reaction gear, means comprising helical splines for effecting an axial movement of the reaction gear and for restraining said gear against rotation when torque is applied thereto by the planet gears, a hydraulic system comprising a fluid pressure responsive member directly in contact with a side of the reaction gear whereby said hydraulic system will yieldingly limit the axial movements of the reaction gear, and a torque indicator operatively connected to the hydraulic system.

8. In a power transmission system, a planetary gear train including a pair of co-axial gear sections subject to torque, helical teeth on said gear sections sloping in opposite directions, a member having corresponding sets of helical teeth meshing with those on the respective gear sections whereby upon the application of torque said gear sections are subject to axial forces tending to move the same relatively to each other in opposite directions, fluid pressure means for opposing said axial forces and torque indicating means actuated by said fluid pressure.

PHILIP PUTNEY NEWCOMB.

REFERENCES CITED

The following references are of record in the file of this patent:

UNITED STATES PATENTS

| Number | Name | Date |
|---|---|---|
| 389,928 | Hurdle et al. | Sept. 25, 1888 |
| 1,588,602 | Midgley | June 15, 1926 |
| 2,297,644 | Angst | Sept. 29, 1942 |
| 2,353,814 | De Pew | July 18, 1944 |
| 2,386,367 | Taylor | Oct. 9, 1945 |
| 2,388,204 | Barnes | Oct. 30, 1945 |
| 2,289,285 | Chilton | July 7, 1942 |

FOREIGN PATENTS

| Number | Country | Date |
|---|---|---|
| 5,804 | Great Britain | 1909 |
| 174,726 | Great Britain | Jan. 30, 1922 |